United States Patent [19]

Saito

[11] Patent Number: 4,630,159
[45] Date of Patent: Dec. 16, 1986

[54] MAGNETIC DISC RECORDING AND/OR REPRODUCING APPARATUS

[75] Inventor: Etsuro Saito, Ayase, Japan
[73] Assignee: Sony Corporation, Tokyo, Japan
[21] Appl. No.: 742,018
[22] Filed: Jul. 18, 1985

Related U.S. Application Data

[62] Division of Ser. No. 389,277, Jun. 17, 1982, Pat. No. 4,536,813.

[51] Int. Cl.⁴ .................. G11B 5/012; G11B 5/55; G11B 21/08
[52] U.S. Cl. .................. 360/133; 360/99; 360/106; 360/137
[58] Field of Search .................. 360/133, 97–99, 360/137, 106; 369/56; 116/284; 235/103

[56] References Cited

U.S. PATENT DOCUMENTS

| | | | |
|---|---|---|---|
| 2,587,970 | 3/1952 | Courtis et al. | 369/56 |
| 2,967,715 | 1/1961 | Black et al. | 369/56 |
| 3,120,781 | 2/1964 | Babcock | 360/132 |
| 3,604,624 | 9/1971 | Miura et al. | 235/103 |
| 3,662,363 | 5/1972 | Chertok | 360/86 |
| 3,678,215 | 7/1972 | Kihara | 179/100 |
| 3,940,147 | 2/1976 | Hunt et al. | 360/86 |
| 4,067,044 | 1/1978 | Maeda | 360/72.1 |
| 4,466,032 | 8/1984 | Saito | 360/130.34 |

Primary Examiner—Robert S. Tupper
Attorney, Agent, or Firm—Lewis H. Eslinger; Alvin Sinderbrand

[57] ABSTRACT

In an apparatus for recording and/or reproducing signals on a flexible disc which is rotatably mounted in a jacket having an indicator for indicating the number of tracks on which the signals have already been recorded, a transducer records and/or reproduces the signals on a surface of the disc so as to form a plurality of circular tracks thereon. The transducer is subsequently moved in the radial direction of the disc to the next adjacent track. The apparatus is further provided with an indicator driving mechanism for driving the indicator of the jacket to shift the latter to a corresponding position as related to the number of the recorded tracks. The indicator driving mechanism is driven in synchronism with the movement of the transducer.

13 Claims, 12 Drawing Figures

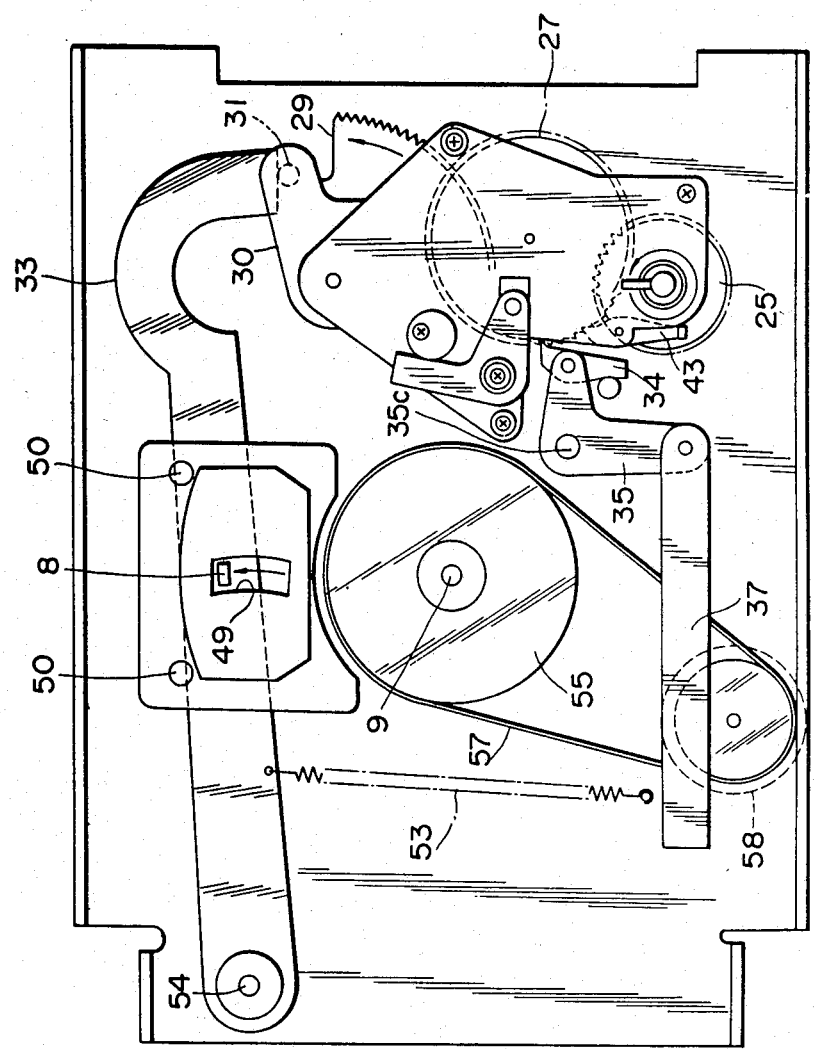

MAGNETIC DISC RECORDING AND/OR REPRODUCING APPARATUS

This is a division of application Ser. No. 06/389,277, filed June 17, 1982 now U.S. Pat. No. 4,536,813.

BACKGROUND OF THE INVENTION

This invention relates to a magnetic recorder of the type that records still-picture signals or the like magnetically in the form of a plurality of tracks on a magnetic sheet.

OBJECT AND SUMMARY OF THE INVENTION

In an attempt to provide a direct visual display of the number of tracks recorded on a magnetic sheet, a magnetic sheet jacket has been designed and is equipped with indicator means in a sheet-containing jacket body to indicate the number of recorded tracks thereon. The object of the present invention resides in providing a magnetic recorder adapted for loading such a magnetic sheet jacket therein.

BRIEF DESCRIPTION OF THE DRAWINGS

FIG. 5 is a plan view illustrating a ratchet wheel and peripheral components with a mounting chassis removed;

FIG. 6 is a plan view illustrating a sector wheel and peripheral components with the ratchet wheel removed;

FIG. 7 (B) is a plan view illustrating the ratchet wheel and peripheral components immediately after depression of the jacket holder as shown in FIG. 7 (A);

FIG. 9 is a plan view illustrating the state subsequent to the completion of the automatic displacement of a magnetic head;

FIG. 10 (B) is a sectional view of the principal components in the state immediately after insertion of both the said rotary pin and a vertically movable pin into the keyhole-like bore.

DESCRIPTION OF THE PREFERRED EMBODIMENTS

Hereinafter, an exemplary embodiment of the invention will be described with reference to the accompanying drawings.

Figure 1:
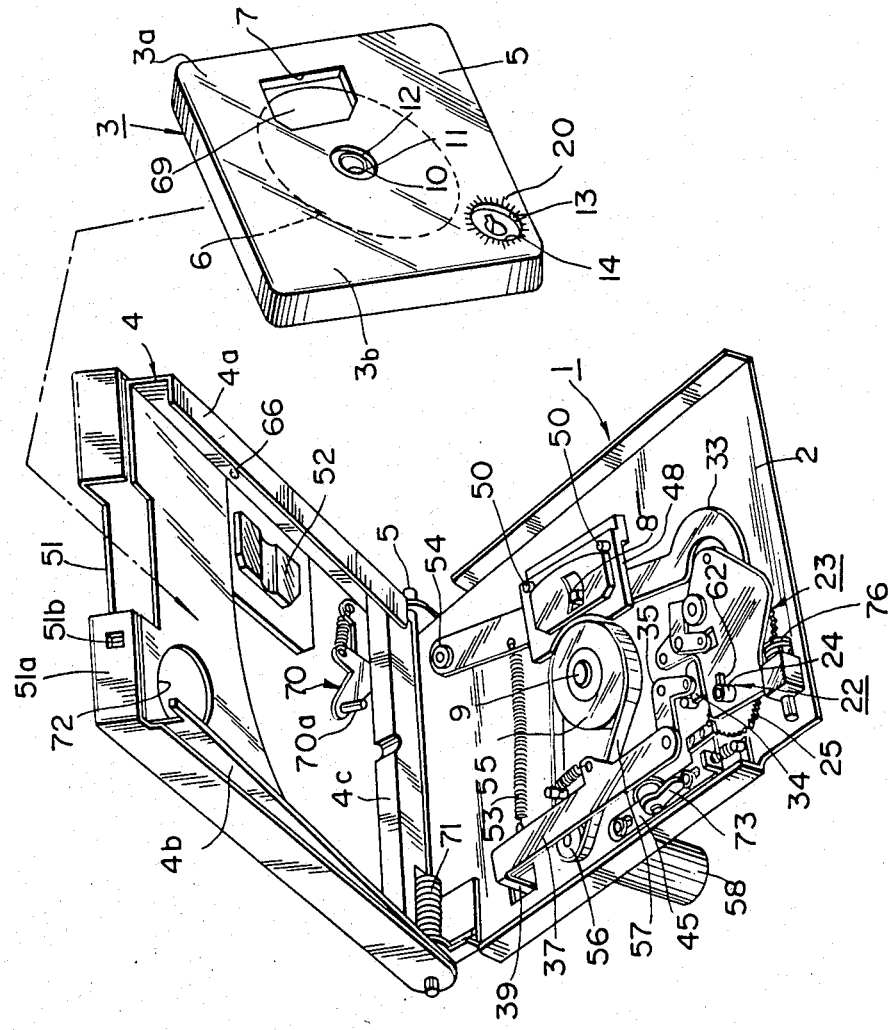
FIG. 1 is a perspective view illustrating a magnetic recorder of this invention and the magnetic sheet jacket to be loaded in the recorder.
Figure 2:
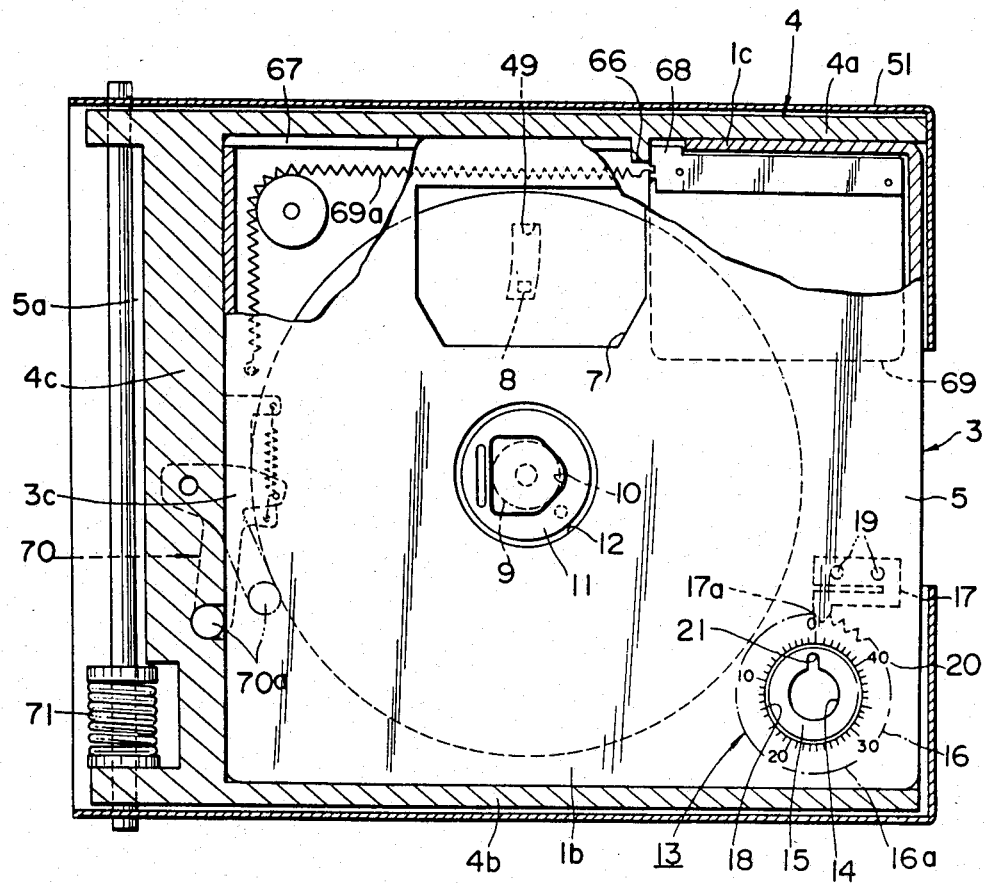
FIG. 2 is a plan view with portions broken away of the magnetic sheet jacket inserted into a jacket holder.
Figure 3:
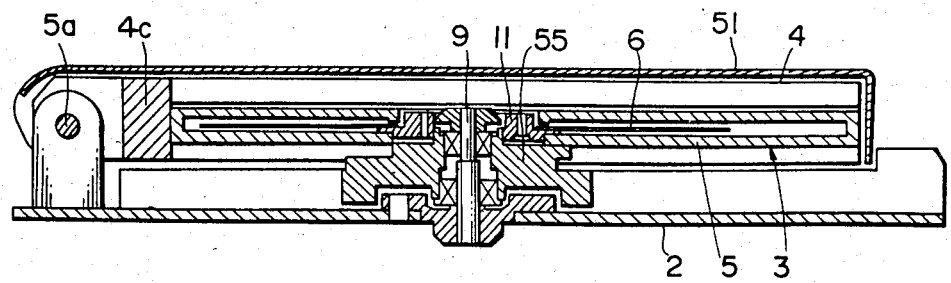
FIG. 3 is a cross-sectional view of the magnetic sheet jacket loaded in the magnetic recorder.

FIG. 1 illustrates a magnetic sheet jacket and a magnetic recorder where the jacket is to be loaded; FIG. 2 illustrates the magnetic sheet jacket inserted into a jacket holder incorporated in the magnetic recorder of FIG. 1; and FIG. 3 illustrates the magnetic sheet jacket loaded in the said magnetic recorder.

In FIG. 1, a magnetic recorder 1 is mounted on a base plate or chassis 2, on which a jacket holder 4 for insertion and extraction of a magnetic sheet jacket 3 is supported via a hange shaft 5a in a manner to be freely openable and closable. A jacket body 5 constituting the exterior part of the magnetic sheet jacket 3 houses a disk-shaped magnetic sheet 6 rotatable in such a manner that video signals representing still-picture information or the like can be recorded in the form of a plurality of annular tracks on the magnetic sheet 6. A window 7 is formed in a portion of the jacket body 5 so that the magnetic sheet 6 is partially exposed to the outside. The window 7 is adapted for insertion of one or more magnetic heads 8 (one in this embodiment) which function to magnetically record a plurality of video signals on the magnetic sheet 6. The magnetic head 8 inserted into the window 7 is displaced on the magnetic sheet 6 in the radial direction (from the inner region toward the outer peripheral region) with each rotation of the magnetic sheet 6 so as to record a plurality of video signals while forming annular tracks on the magnetic sheet 6.

At the center of rotation, the magnetic sheet 6 is equipped with a disk-shaped reinforcing member 11 which has a drive hole 10 which permits insertion of a rotary drive spindle 9 provided in the magnetic recorder 1. The magnetic sheet 6 is hence rotatable around an opening 12 formed in the jacket body 5.

An indicator means 13 for indicating the number of tracks recorded magnetically on the sheet 6 is provided in a portion of the jacket body 5. As illustrated in FIG. 2, the indicator means 13 includes a disk-shaped dial member 15 having a keyhole-like bore 14, a rotary gear 16 united with the dial member 15, and a stopper member 17 having an engaging portion 17a which is elastically engageable with a sawtooth region 16a of the rotary gear 16. The dial member 15 is housed in the jacket body 5 and is allowed to be freely rotatable at the opening 18 formed in the body 5. The stopper member 17 is anchored firmly with set-screws 19 to the jacket body 5 and serves to rotate the gear 16 intermittently.

Around the opening 18 of the jacket body 5, there is provided a scale 20 to indicate the numbers which correspond respectively to the annular tracks recorded magnetically on the sheet 6. In the embodiment disclosed in FIG. 2, the scale 20 has counterclockwise graduations ranging sequentially from "0" to "50". And a notch pointer 21 formed in the keyhole-like bore 14 serves as an indicator to point at each graduation of the scale 20.

Figures 5, 6:
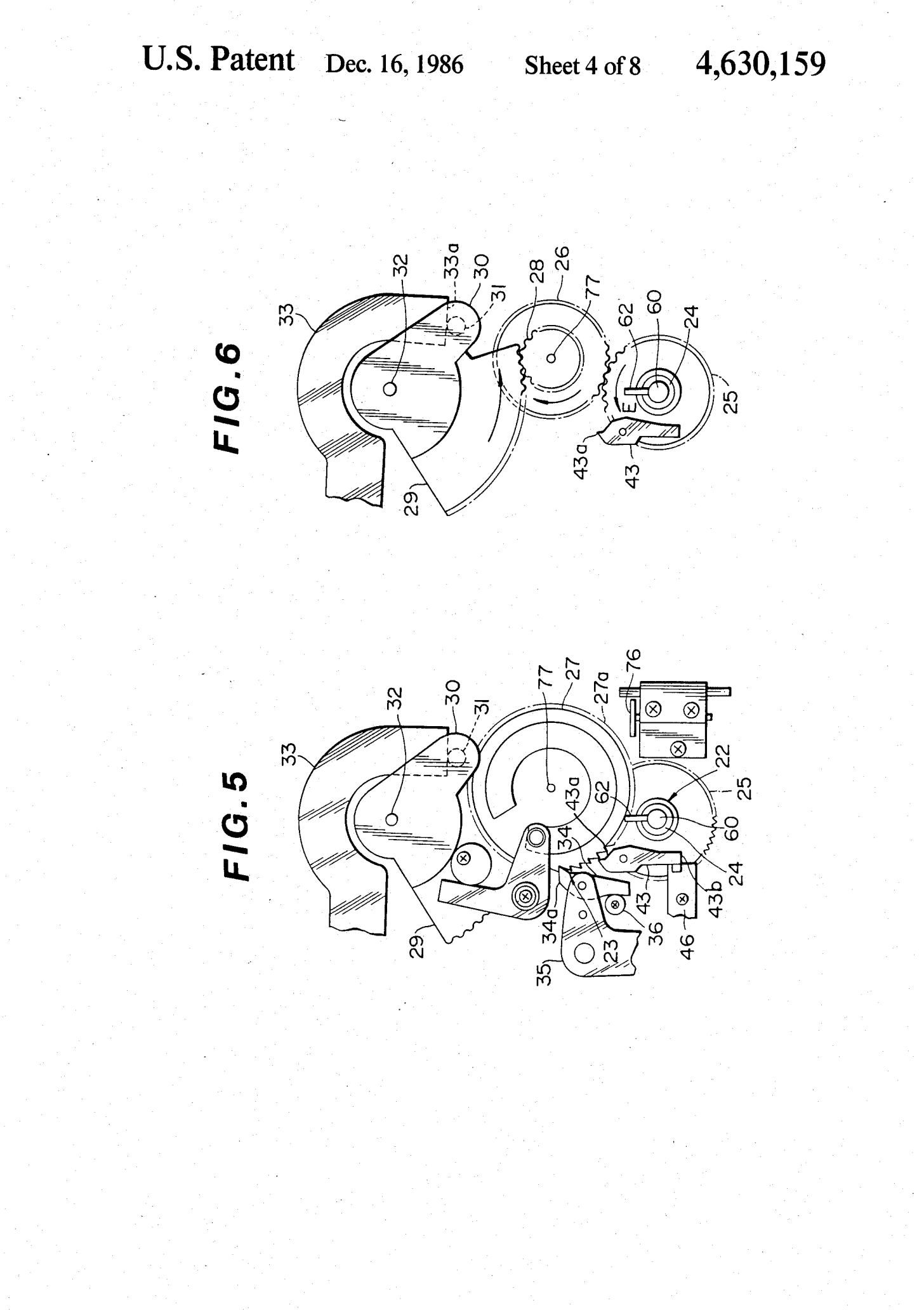

The chassis 2 has a mounted drive means 22 thereon for actuating the indicator means 13 located in the jacket body 5, and also a feed means 23 actuated in relation to the drive means 22 and capable of automatically and radially displacing the magnetic head 8 in accordance with the number of tracks recorded on the magnetic sheet 6. The drive means 22 further has a rotary pin 24 for rotating the dial member 15 in the jacket body 5 while inserted in the keyholelike bore 14 of the dial member 15, and a drive gear 25 disposed coaxially with the rotary pin 24 as illustrated in FIG. 5. Meanwhile, the feed means 23 has a ratchet wheel 27 disposed coaxially with a first gear 26 (FIG. 6) which is engaged with the drive gear 25, a sector wheel 29 engaged with a second gear 28 disposed coaxially with the ratchet wheel 27, a pressure member 30 united with the sector wheel 29, a swing lever 33 rotated around a pivot 54 by a boss 31 formed at the fore end of the pressure member 30, and a ratchet feed pawl 34 for intermittently pressing a toothed part 27a of the ratchet wheel 27 so as to swing the lever 33 in a predetermined direction. The ratchet feed pawl 34 is attached rotatably to one end 35a of an L-shaped swing link 35, and a guide pin 36 is affixed on the chassis 2 in the vicinity of the pawl 34 so as to guide the same properly. The other end 35b of the swing link 35 is pivoted at one end 37a of a reciprocating link 37 whose other end 37b extends towards the lower surface of the chassis 2 via a through hole 38 formed therein. An extended piece 39 of the link 37 is also secured to a plunger 41 of a solenoid 40. A spring 42, which is anchored at one end on the chassis 2, is attached at its other end to the middle portion of the reciprocating link 37. Accordingly, the link 37 is normally biased toward the solenoid 40 by the elastic force of the spring.

Figure 4:
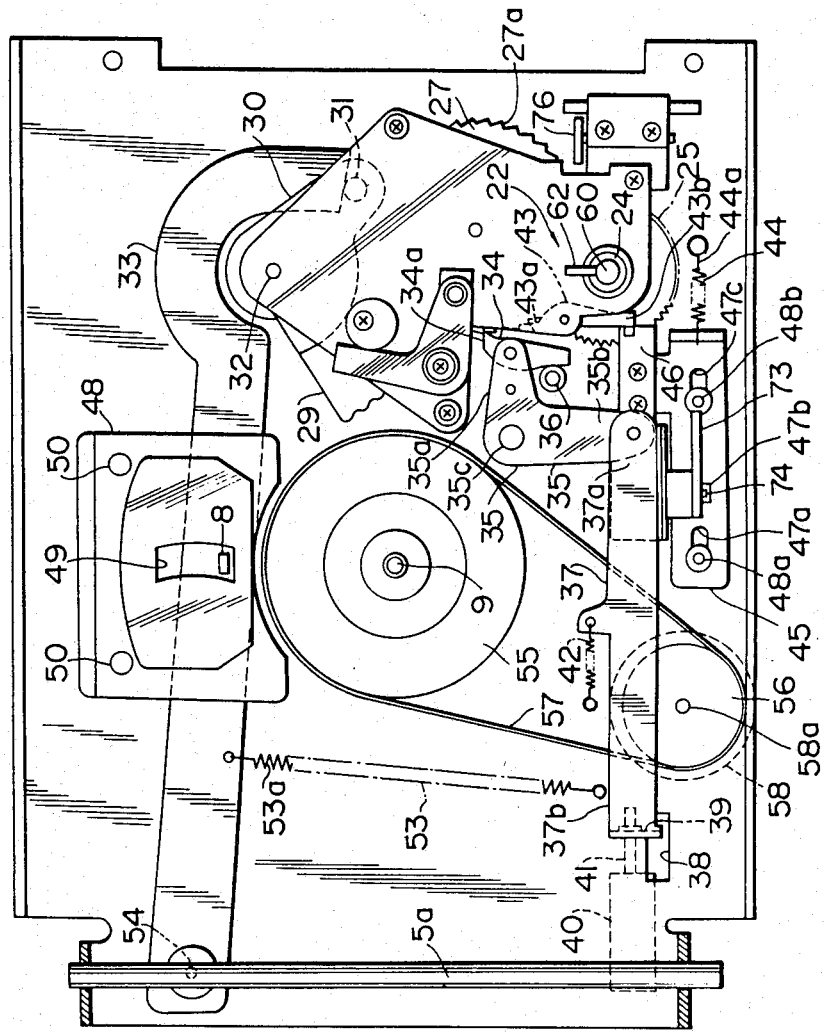
FIG. 4 is a plan view of the magnetic recorder prior to its operation.

A ratchet check pawl 43 for preventing reverse rotation of the ratchet wheel 27 is pivotally and rotatably mounted on the chassis 2 at a position proximate to the reciprocating link 37. The check pawl 43 is kept in elastic engagement with the toothed part 27a of the ratchet wheel 27 by means of a spring so that a wedge-shaped engaging portion 43a of the pawl 43 is always thrusted against the toothed part 27a. A pressed portion 43b of the check pawl 43 located on the reverse side with respect to the engaging portion 43a is pressed by means of a pressure plate 46 which is attached securely to a slide plate 45 pulled rightward in FIG. 4 by a spring 44 whose one end 44a is anchored on the chassis 2. Consequently, the engaging portion 43a of the check pawl 43 provided for preventing any reverse rotation of the ratchet is normally separated from the toothed part 27a of the ratchet wheel 27 as illustrated in FIG. 4. Elongate holes 47a, 47b and 47c are formed in the slide plate 45, and guide pins 48a and 48b are affixed in the outer elongate holes 47a and 47c respectively. The magnetic head 8 is attached to the middle portion of the swing lever 33 so as to perform magnetic recording of video signals such as still-picture information in a concentric manner on the magnetic sheet 6. In this embodiment, still pictures are magnetically recorded in the form of annular tracks while the head 8 is displaced sequentially on the magnetic sheet 6 from the inner region toward the outer peripheral region. The magnetic head 8 is located under a head insertion window 49 formed in a lower guide plate 48 and is inserted therein from below so as to stabilize and assure contact with the magnetic sheet 6. A pair of positioning pins 50 are affixed on the lower guide plate 48 for determining the position of the sheet regulating face of an upper guide plate 52 which is secured on the inner surface of a case cover 51 opposed to the lower guide plate 48. One end 53a of a spring 53 is anchored to the swing lever 33 so as to apply a force in a clockwise direction around a pivot 54 as shown in FIG. 4.

The drive spindle 9 which is to be inserted into the drive hole 10 formed in the jacket body 5, is positioned substantially at the center of the chassis 2 in a freely rotatable manner, and a rotary table 55, which serves also as a flywheel, is attached to the drive spindle 9. A belt 57 is provided to connect the rotary table 55 with a belt pulley 56, which is attached to the shaft 58a of a drive motor 58.

Figure 10A:
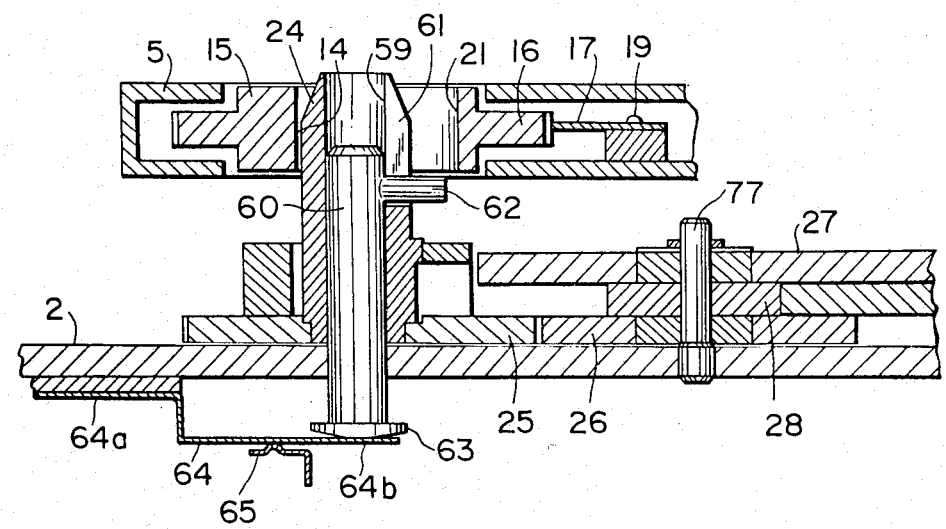
FIG. 10 (A) is a sectional view illustrating a rotary pin and the peripheral components immediately after insertion of the pin into a keyhole-like bore.
Figure 10B:
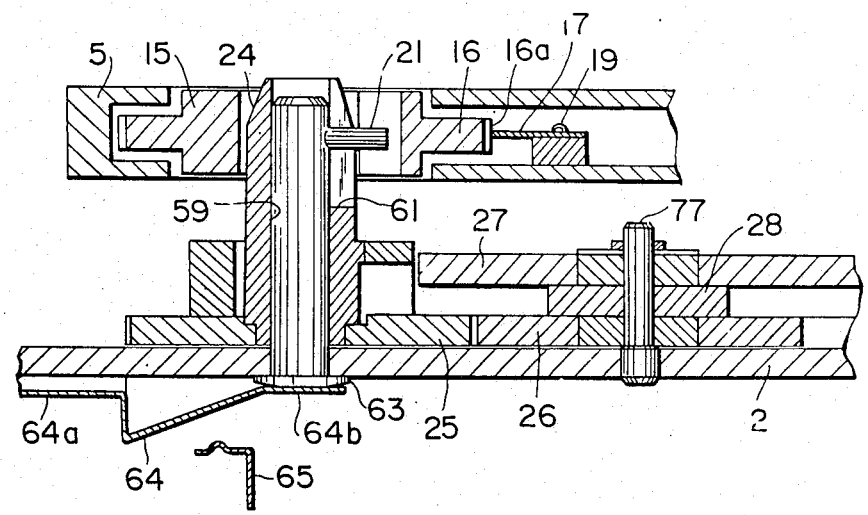

As illustrated in FIG. 10 (A) and (B), the rotary pin 24 is cylindrically shaped and has a hole 59 extending longitudinally therealong into which a vertically movable pin 60 in inserted. A protrusion 62 formed on the upper end of pin 60 is inserted into a notch 62 at the fore end of the rotary pin 24, while the lower end of the pin 60 has a stopper flange 63 engageable with the lower surface of the chassis 2. The bottom face of the stopper flange 63 is resiliently maintained in an upward position as shown in FIG. 10 (A) by one end 64b of an elastic member 64 which serves also as a contact and is permanently anchored at its other end 64a to the chassis 2. Therefore, when the protrusion 62 on the vertically movable pin 60 comes to be positionally coincident with the pointer 21 in the keyhole-like bore 14, the pin 60 is inserted into the bore 14 as illustrated in FIG. 10 (B).

Upon complete insertion of the pin 60 into the bore 14, the elastic member 64 serving as a contact is spatially separated from the other contact 65 as shown in FIG. 10 (B).

Prior to describing the operation of the magnetic recorder having the structure mentioned above, a brief explanation will be given on how to load the magnetic sheet jacket into the jacket holder as incorporated in the present magnetic recorder.

In the first state, the sheet jacket 3 is inserted into the jacket holder 4 lifted upward with respect to the chassis 2 as shown in FIG. 1. Since the two side portions 3a and 3b of the sheet jacket 3 are guided by the U-shaped support regions 4a and 4b of the jacket holder 4, the sheet jacket 3 is readily insertable toward the hinge shaft 5a and is positioned therebetween. When the sheet jacket 3 thus inserted reaches a predetermined position in the jacket holder 4, a boss 66 formed on one of the support regions which in FIG. 2 is support region 4a, fits into an elongate hole or slot 67 formed along one side wall of the sheet jacket 3 as illustrated in FIG. 2. A lid member 69 normally positioned so as to retain the window 7 of the sheet jacket 3 in a closed position, and is subsequently ejected by the boss 66 as it is urged against the resiliency of an elastic member 69a, thereby opening the window 7. Subsequently where the sheet jacket 3 is further advanced into the jacket holder 4 until the fore edge 3c is slidably forced into contact with the joint plate 4c of the holder 4, and the case cover 51 on the holder 4 is pressed downward, the sheet jacket 3 is surrounded by the joint plate 4c and the front lateral face 51a at the opposite end of the case cover 51, and thus the sheet jacket 3 is loaded in the jacket holder 4. The joint plate 4c of the holder 4 is equipped with a positioning mechanism 70 for resiliently positioning the loaded sheet jacket 3 toward the front lateral face 51a, and the jacket 3 further is supported by both a pressure pin 70a of the positioning mechanism 70 and the front lateral face 51a so as to be held at a proper predetermined position in the holder 4.

In the next stage wherein the case cover 51 and the jacket holder 4 are further advanced against the elasticity of an elastic member 71 wound around the hinge shaft 5a toward the chassis 2, the cover 51 and the holder 4 become positioned immediately above and in engaging relationship with the chassis 2. As such, the drive spindle 9 is inserted into the drive hole 10 in the jacket 3, and the rotary pin 24 is inserted into the keyhole-like bore 14 of the dial member 15 and also through a circular hole 72 formed in the holder 4. Upon insertion of the rotary pin 24 into the bore 14, the protrusion 62 on the vertically movable pin 60 is inserted into the notch pointer 21 in the case where the pointer 21 and the protrusion 62 are positionally opposed to each other. As a result, the pointer 21 and the protrusion 62 each are aligned and point at the graduation "0" of the scale 20, while the elastic member 64 becomes separated from the other contact 65.

Figure 7A:
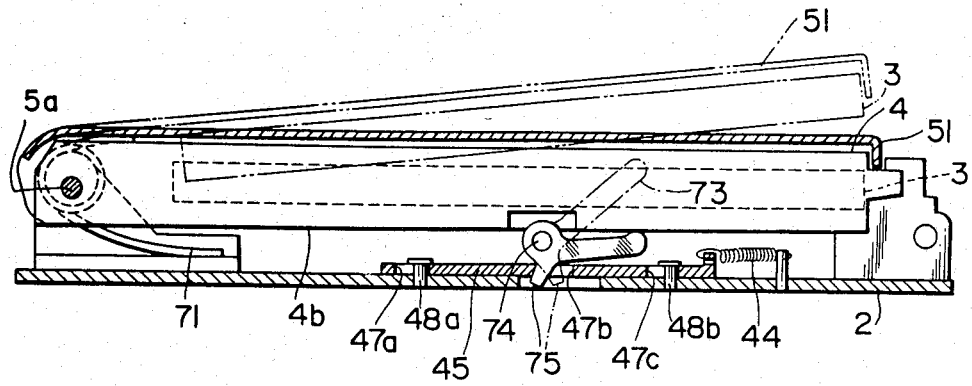
FIG. 7 (A) is a sectional view illustrating the state immediately after depression of the jacket holder toward the chassis.
Figure 7B:
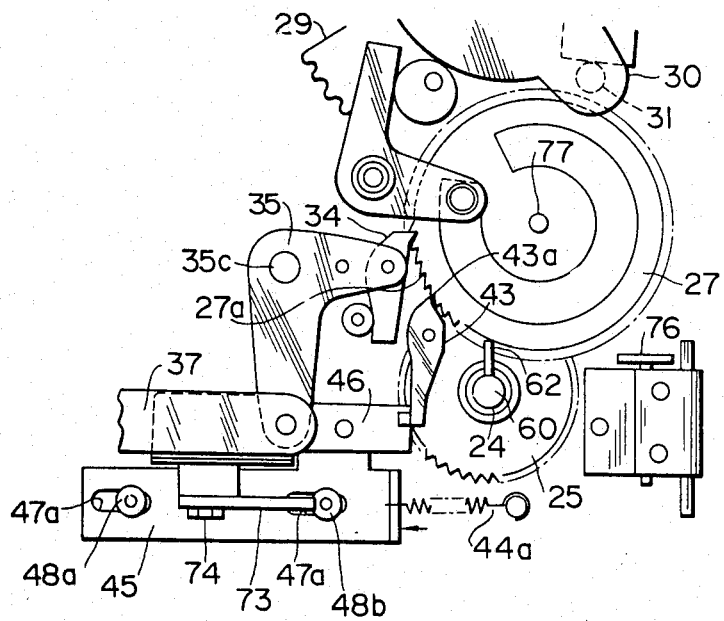

In this position, the upper guide plate 52 is positioned by the pins 50 on the lower guide plate 48, and the magnetic head 8 is brought into contact with, and at the innermost position of, the magnetic sheet 6 by way of the window 7 in the jacket body 5. An automatic lever 73 located as shown by a one-dot chained line in FIG. 7 (A) is pressed by the bottom face of the support region 4b of the jacket holder 4 and is thereby rotated clockwise around the pivot 74, so that a projection 75 as formed on the lever 73 pushes on an end of the elongate hole 47b, thereby moving the slide plate 45 leftward along the guide pins 48a and 48b, as shown in FIG. 7 (B) against the elasticity of the spring 44. In this manner the engaging portion 43a of the ratchet check pawl 43 is thrust against to the toothed part 27a of the ratchet wheel 27 to prevent any reverse rotation thereof.

A lock claw 76 located on the chassis 2 is inserted into a lock hole 51b formed in the front lateral face 51a of the case cover 51, and consequently both the case cover 51 and the jacket holder 4 are held in a position pressed toward the chassis 2 by the lock claw 76.

From the foregoing, it can be seen that the solenoid 40, the swing lever 33 connected with the transducer means 8, the drive means 22 engageable with the indicator means 14, 21, and the structure connecting the solenoid 40 to both the swing lever 33 and the drive means 22 constitute indexing means for translating the transducer means and driving the indicator means.

Figure 8:
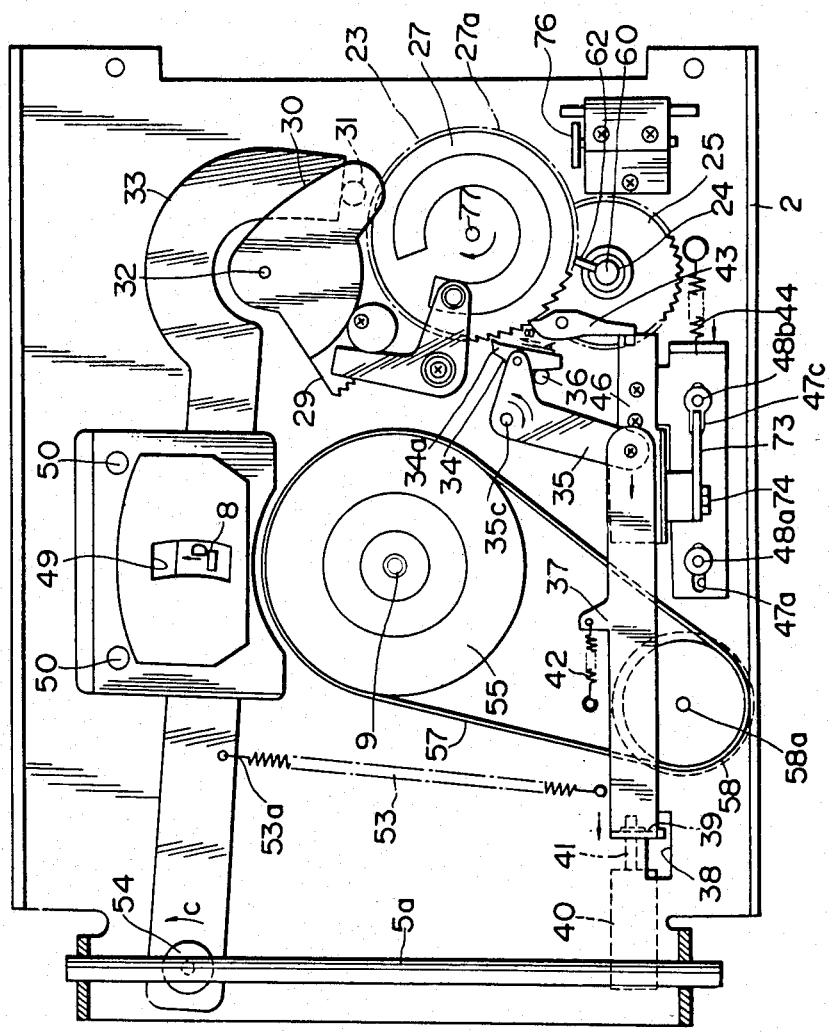
FIG. 8 is a partial plan view with portions omitted illustrating the state immediately after the action of a ratchet feed pawl.

When the drive motor 58 is energized by a means not shown, in the above position and rotates the said belt pulley 56, belt 57, rotary table 55 and drive spindle 9, the magnetic sheet 6 is rotated at a high velocity or first average speed by the drive spindle 9 so that a still-picture signal is magnetically recorded in the form of an annular track by the head 8 along the innermost region on the lower surface of the magnetic sheet 6. Upon completion of one rotation of the magnetic sheet 6, the plunger 41 of the solenoid 40 is immediately pulsed to shift the reciprocating link 37 leftward as shown in FIG. 8. Accordingly, the swing link 35 is rotated clockwise around the pivot 35c, and the ratchet feed pawl 34 is moved along the guide pin 36 in the direction of arrow A as shown in FIG. 8. The engaging portion 34a of the feed pawl 34 is thus retreated from the root in the toothed part 27a of the ratchet wheel 27.

Subsequently, when the plunger 41 of the solenoid 40 is driven in the reverse direction, the reciprocating link 37 is shifted rightward in FIG. 8 to rotate the swing link 35 counterclockwise around the pivot 35c. Accordingly, the ratchet feed pawl 34 is moved in the direction of arrow B as shown in FIG. 8 while being guided by the guide pin 36, so that the engaging portion 34a presses the crest of the toothed part 27a adjacent to the aforesaid root, thereby advancing the toothed part 27a. As a result, the ratchet wheel 27 is rotated one pitch around the pivot 77 clockwise in FIG. 8, and the first gear 26 is also rotated in the same direction. The second gear 28 disposed coaxially with the first gear 26 then rotates the sector wheel 29 around th pivot 32 counterclockwise in FIG. 6, and then the boss 31 of the pressure member 30 rotatable with the sector wheel 29 presses the surface 33a of the swing lever 33, which is thereby rotated around the pivot 54 in the direction of arrow C as shown in FIG. 8, so that the magnetic head 8 mounted on the lever 33 is slightly upwardly displaced in the direction of arrow D, as shown in FIG. 8, within the window 49. Eventually, the magnetic head 8 is shifted automatically to the next position for forming a second track adjacent to the first track which was previously recorded at the innermost position on the lower surface of the magnetic sheet 6, as described hereinabove. In the meanwhile, when the ratchet wheel 27 is rotated by the feed pawl 34 to advance one pitch, the drive gear 25 is rotated by the first gear 26, which is driven in relation to the ratchet wheel 27 in the same direction, so that the rotary pin 24 related to the drive gear 25 is also rotated in the direction of arrow E as shown in FIG. 6. Accordingly, the dial member 15, is rotated in the same direction by the rotary pin 24, thereby causing the notch pointer 21 and the protrusion 62 to point at the graduation "1" of the scale 20.

In the following stage where a magnetic recording operation has been executed to form a second track on the magnetic sheet 6 by the magnetic head 8 displaced automatically from the innermost position on the magnetic sheet 6 to the second position as described above, the ratchet wheel 27 is again advanced one pitch intermittently by the action of the feed pawl 34 as driven by the solenoid 40,, so that the swing lever 33 is rotated in the direction C as shown in FIG. 8 via the said second gear 28, sector wheel 29 and the boss 31 of the pressure member 30. Consequently, the magnetic head 8 is displaced automatically by the swing lever 33 up to the position corresponding to a third track. Since the rotary pin 24 is also rotated during this period of time, the notch pointer 21 and the protrusion 62 are rotated similarly to point at the graduation "2" of the scale 20.

In this manner, the magnetic head 8 is displaced sequentially at a second average speed. The first average speed mentioned above substantially exceeds the second average speed. The displacement of the magnetic head 8 is effected by the actions of the atchet feed pawl 34 and the swing lever 33 in accordance with the number of tracks recorded on the magnetic sheet 6. The dial member 15 of the indicator means 13 is simultaneously rotated to indicate a number representing the number of recorded tracks, hence achieving a still-picture recording operation which provides a mechanism for the direct visual display through of the number of the recorded tracks on a particular magnetic sheet 6 by viewing through a circular hole (not shown) formed in the case cover 51 in opposed relation to the circular hole 72 in the jacket holder 4.

In this embodiment, each of the ratchet wheel 27 and the drive gear 25 for rotating the pin 24 is so designed as to have 50 teeth to form 50 tracks on the magnetic sheet 6, so that 50 still pictures are magnetically recordable. However, it is of course possible to increase or decrease the number of teeth as may be desired.

In the situation where the magnetic sheet jacket loaded initially in the magnetic recorder is subsequently extracted therefrom after recording, for example, only 30 tracks (30 still pictures) on the magnetic sheet 6, the notch pointer 21 of the dial member 15 in the jacket will point at the number "30". This enables the user to reconfirm the number of tracks formed in the first recording operation. And when the sheet jacket is again loaded in the magnetic recorder, since the notch pointer 15 still indicates the graduation "30", the vertically movable pin 60 set at the position corresponding to the graduation "0" is not insertable into the bore 14. Therefore the protrusion 62 of the pin 60 is rotated automatically up to the position for the graduation "30". Consequently, during the period of such rotation, the elastic member 64 and the contact piece 65 are kept in contact with each other, and the magnetic head 8 is prohibited from performing a magnetic recording operation as long as this state of contact is maintained. As a result, it becomes possible to prevent erroneous recording of a new still picture on any of the tracks previously recorded.

According to the present invention, as described hereinabove, the magnetic head can thus be automatically displaced in the present mechanism to any desired position for recording a plurality of tracks on the magnetic sheet, and direct visual recognition of the number of tracks (still pictures) recorded on the magnetic sheet is attainable with ease and certainty.

What is claimed:

1. A magnetic disc cartridge of the type having a jacket for containing a rotatable magnetic disc therein, said disc having a hub member for receiving a drive member to rotate said disc to record information in circular tracks on said disc and comprising an opening in said jacket through which said hub member is accessed; and externally accessible indicator means provided on said jacket and adapted to be incrementally turned for indicating the number of tracks in which information has been recorded.

2. The magnetic disc cartridge of claim 1 wherein said indicator means comprises a circular dial; a pointer associated with said dial; and an index scale for providing track number indications; said dial and said index scale being relatively movable with respect to each other.

3. The magnetic disc cartridge of claim 2 wherein said dial is rotatably mounted in said jacket, and said jacket is provided with a further opening for receiving means to rotate said dial.

4. The magnetic disc cartridge of claim 3 wherein said dial is provided with a recess for receiving a projection on said means to rotate said dial, such that the rotation of said projection rotatably drives said dial.

5. The magnetic disc cartridge of claim 4 wherein said recess is said pointer.

6. The magnetic disc cartridge of claim 3 wherein said indicator means further comprises releasable locking means provided in said jacket for releasably locking said dial at discrete rotary positions.

7. The magnetic disc cartridge of claim 6 wherein said dial includes a rotatable gear member having peripheral teeth; and said releasable locking means comprises resilient pawl means for insertion between adjacent teeth to lock said rotatable gear member and said dial at the then-present position thereof.

8. The magnetic disc cartridge of claim 7 wherein said jacket includes spaced apart top and bottom walls defining a space for said magnetic disc; and further including means for mounting said resilient pawl means on the inner surface of one of said walls.

9. The magnetic disc cartridge of claim 8 wherein said resilient pawl means comprises a resilient arm having a nose portion for insertion between adjacent teeth of said rotatable gear member.

10. The magnetic disc cartridge of claim 9 wherein said means for mounting said resilient pawl means comprises a mounting block mounted on said inner surface of said one wall, said mounting block and said resilient arm being of unitary construction with said resilient arm depending from said mounting block.

11. The magnetic disc cartridge of claim 8 wherein said dial is formed on said rotatable gear member and is of unitary construction therewith.

12. The magnetic disc cartridge of claim 11 wherein said gear member is symmetrically disposed with respect to said dial, such that substantially equal portions of said dial extend above and below said gear member.

13. The magnetic disc cartridge of claim 7 wherein adjacent peripheral teeth of said gear member are angularly spaced apart by a distance corresponding to the separation between adjacent tracks on said disc.

* * * * *